May 8, 1945. W. T. HEDLUND 2,375,359
REFRIGERATION
Filed June 15, 1940 3 Sheets-Sheet 1
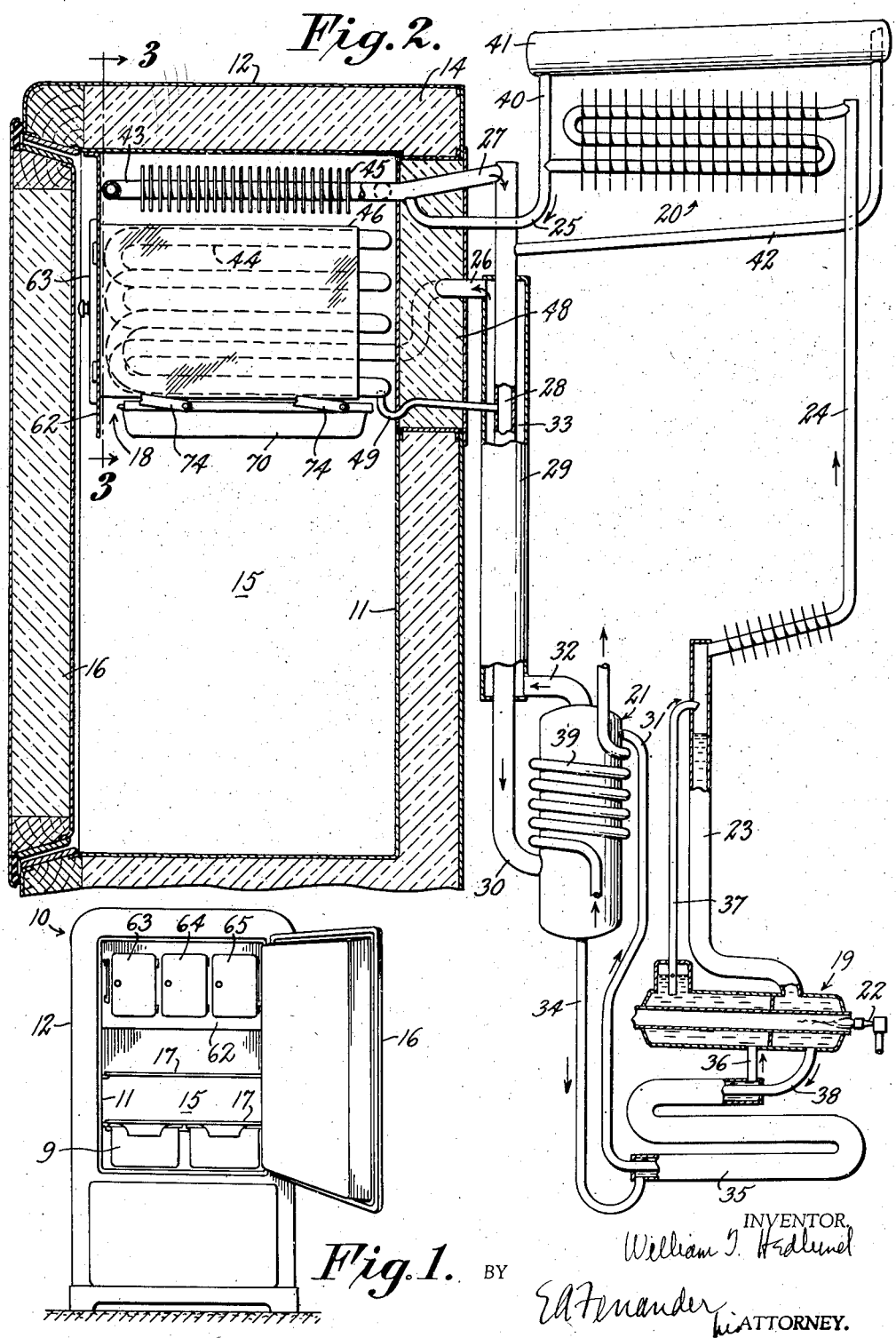

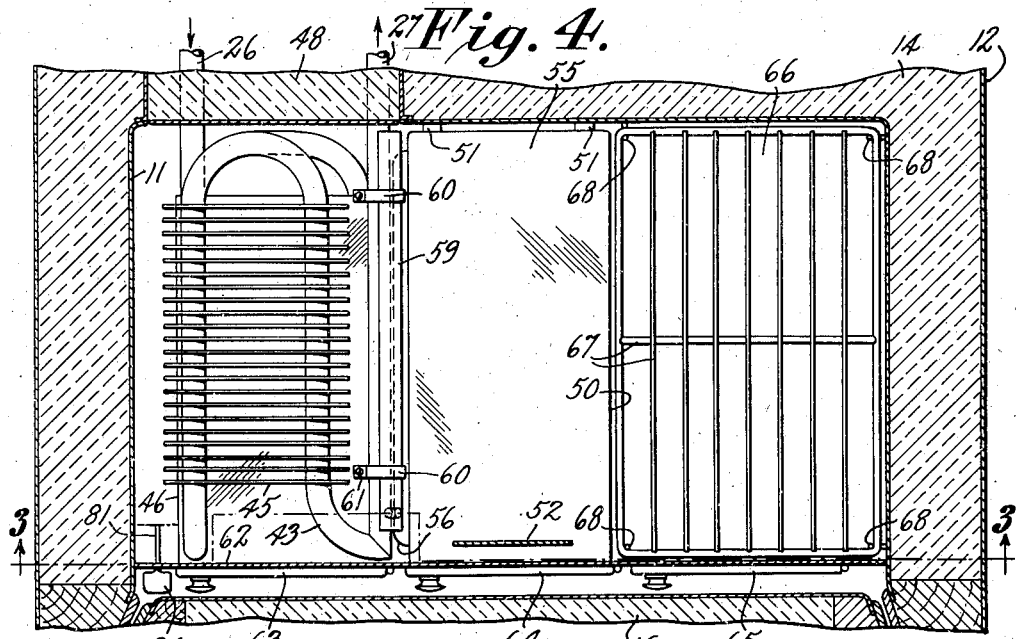

May 8, 1945. W. T. HEDLUND 2,375,359
REFRIGERATION
Filed June 15, 1940 3 Sheets-Sheet 3
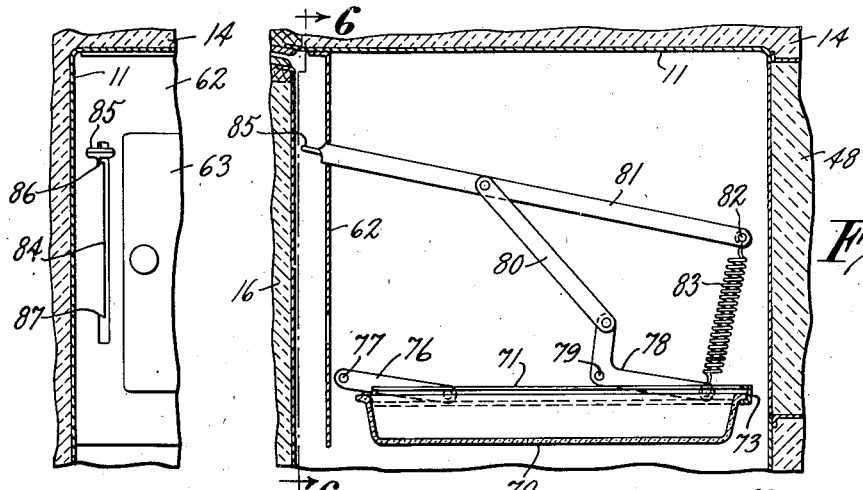
Fig.5.
Fig.6.
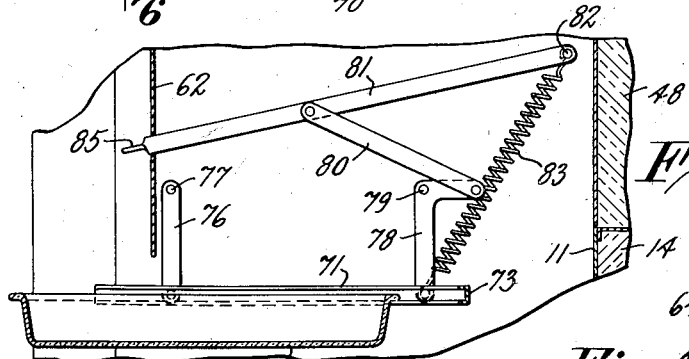
Fig.8.
Fig.4a.
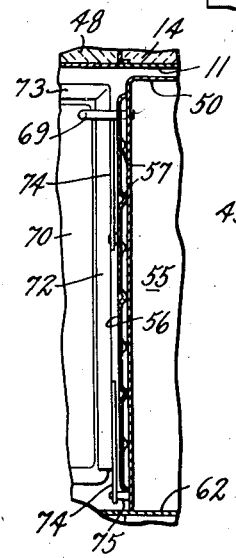
Fig.7.
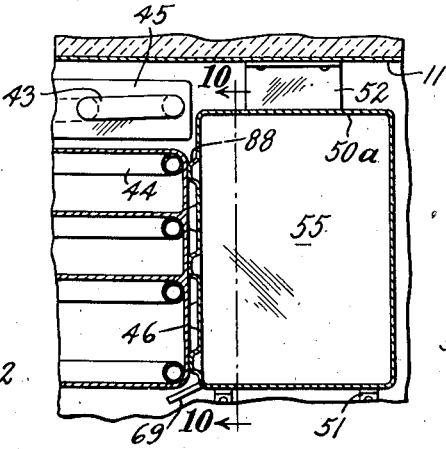
Fig.9.
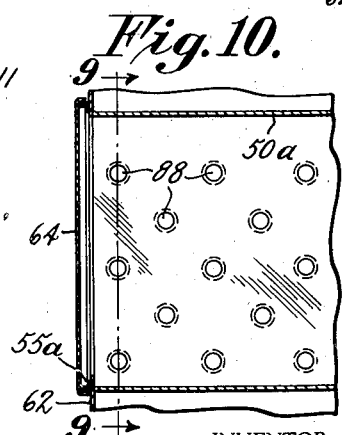
Fig.10.
INVENTOR.
William T. Hedlund
BY
ATTORNEY.

Patented May 8, 1945

2,375,359

UNITED STATES PATENT OFFICE 2,375,359

REFRIGERATION

William T. Hedlund, New Rochelle, N. Y., assignor to Servel, Inc., New York, N. Y., a corporation of Delaware Application June 15, 1940, Serial No. 340,674

5 Claims. (Cl. 62—99)

My invention relates to refrigeration, and more particularly to preservation of foodstuffs in household refrigerators.

The butcher, the grocer, the dairyman, the vegetable and fruit vendor, and the iceman each has his particular problem of refrigeration in connection with making ice or preservation of foodstuffs. Freezing water into ice and preserving frozen food products requires freezing temperatures. On the other hand, natural fruits and many vegetables are spoiled by freezing. Meats should be kept at low temperatures but should not become dry. Vegetables also should not become dry but do not need to be preserved at such low temperatures. All of these problems converge in household refrigerators in which the products of the butcher and grocer, the fruit and vegetable vendor, and the dairyman are placed for safekeeping in the home, and in which ice is made and frozen foods are kept. The making of ice requires freezing temperatures, and freezing temperatures cause drying of air and drying of meat and vegetables contacted by the dry air.

Cool dry air is required for proper preservation of a number of products as, for example, bottled goods, eggs, and skin fruits. But dry air causes deterioration of other products such as meats and vegetables. A householder is confronted with these problems when placing foodstuffs in his refrigerator and therefore requires a refrigerator having provision for storage of foodstuffs under different humidity conditions.

For making ice and preserving frozen food products, household refrigerators are provided with freezing elements for maintaining one or more ice tray compartments at freezing temperature. Water vapor condenses out of air in the refrigerator and freezes to ice or frost on these freezing elements, resulting in dry air in the refrigerator. For this reason household refrigerators have been provided with vegetable pans which are closed containers for vegetables and the like in which the air is kept out of circulation and therefore maintained at a higher humidity. Closed containers of this type have also been provided for storage of meat products. But these containers have been refrigerated indirectly through the medium of air in the refrigerator.

It is an object of my invention to provide a household refrigerator that affords the user the desired selectivity of refrigerator zones, preferably in a single general storage space having different humidity conditions for proper preservation of different foodstuffs. In accordance with the invention, I provide, in a refrigerator storage compartment, a freezing element, and a separate inner compartment refrigerated so that the temperature is low for preservation of meats and the like, and the humidity is relatively high so that the refrigerated meat does not become dry. Cooling of the high humidity compartment is effected by an evaporator or cooling unit of refrigeration apparatus which also effects cooling of the storage space proper. The high humidity compartment is provided with its own door or other means to permit access thereto and also to substantially prevent flow of air from such high humidity compartment into the storage space proper and from the latter into the high humidity compartment. In order to obtain efficient utilization of the refrigerator storage space, the low temperature-high humidity compartment is preferably arranged alongside the cooling unit which effects cooling of the storage space proper. Thus, the freezing zone and low temperature-high humidity cooling zone may be disposed at the same level at the upper part of the storage space whereby the intermediate region of the storage space forms a relatively wide and unobstructed space serving as a low temperature cooling zone of reduced humidity. Closed or substantially closed containers are preferably disposed at the bottom part of storage space proper to provide a cooling zone of higher humidity and temperature, as for certain vegetables.

The low temperature-high humidity compartment may be cooled by transferring cooling effect thereto from an evaporator structure or cooling unit which is operated below the freezing temperature of water. In such case heat is transferred in such a manner that the low temperature-high humidity compartment is cooled to a low temperature but not below the freezing temperature of water, so that frost formation and congealing of moisture in the high humidity compartment is avoided. I preferably employ a cooling unit or evaporator structure of suitable refrigeration apparatus having a low temperature cooling element and a higher temperature cooling element. The low temperature cooling element operates below the freezing temperature of water, and the higher temperature cooling element operates at a higher temperature of which at least a portion thereof is substantially at or above the freezing temperature of water. In accordance with my invention, in order to make certain that the high humidity compartment will always be cooled to a temperature above that of freezing, a heat transfer system is provided whereby cooling effect is transmitted thereto from the portion of the higher temperature cooling element which is adapted to operate substantially at or above the freezing temperature of water. There being some temperature drop in the transfer between the compartment and the cooling unit this arrangement can be made to assure that no formation of frost will take place in the high humidity compartment which would tend to reduce the humidity therein.

It is another object of the invention to arrange the freezing zone and low temperature-high humidity zone in such a manner that the compartment forming the low temperature-high humidity zone serves as a baffle to cause circulation of air to take place naturally in the storage space proper in a definite manner. In the present embodiment which is illustrative of the invention, a third compartment is provided alongside the freezing and low temperature-high humidity compartments, with such third compartment being cooled by air circulating in the storage space proper and in the path of flow of such circulating air at a region where its temperature is the highest.

It is a further object of the invention to provide a plurality of compartments which form several cooling zones alongside of each other at the upper part of a refrigerator storage space with a defrosting or drip tray located beneath the compartment serving as a freezing zone, and a drain conduit for draining condensate from the low temperature-high humidity compartment to the tray. The several compartments are preferably provided with a front baffle plate having doors to permit access into the compartments with such baffle being arranged to conceal the defrosting tray from view. Suitable mechanism may be provided to lower the defrosting tray from its normal position and also move the latter forward beneath the baffle plate to facilitate handling of the tray. The mechanism just mentioned may be provided with a readily accessible operating part so that the tray can readily be lowered from and moved back to its normal position beneath the freezing compartment at the rear of the front baffle plate.

The invention, together with the above and other objects and advantages thereof, will be more fully understood from the following description taken in conjunction with the accompanying drawings forming a part of this specification, and of which;

Fig. 1 is a front elevation of a refrigerator cabinet embodying the invention, the door of the cabinet being in its open position;

Fig. 2 more or less diagrammatically illustrates a refrigeration system and a side vertical sectional view of the refrigerator cabinet shown in Fig. 1 and taken on line 2—2 of Fig. 3;

Fig. 3 is a vertical sectional view taken on lines 3—3 of Figs. 2 and 4 to illustrate more clearly the arrangement of parts in the refrigerator storage space;

Fig. 4 is a horizontal sectional view taken on line 4—4 of Fig. 3;

Fig. 4a is a fragmentatry sectional view taken on line 4a—4a of Fig. 3;

Fig. 5 is a sectional view taken on line 5—5 of Fig. 3 to illustrate more clearly the mechanism for lowering and raising the defrosting or drip tray located beneath the ice freezing compartment and shown in its upper positions;

Fig. 6 is a fragmentary sectional view taken on line 6—6 of Fig. 5;

Fig. 7 is a fragmentary sectional view taken on line 7—7 of Fig. 3;

Fig. 8 is a sectional view similar to Fig. 5 with the defrosting or drip tray in its lower position;

Fig. 9 is a fragmentary sectional view similar to Fig. 3 and taken on line 9—9 of Fig. 10 to illustrate another embodiment of the invention and;

Fig. 10 is a vertical sectional view taken on line 10—10 of Fig. 9.

Referring more particularly to Figs. 1 and 2, I have shown the invention embodied in a refrigerator comprising a cabinet 10 having an inner metal shell 11 arranged to be supported within an outer metal shell 12 and insulated therefrom with any suitable insulating material 14. The inner shell 11 forms a thermally insulated storage space 15 into which access may be had by a door 16 hinged to the front of the cabinet. The storage space 15 is provided with a plurality of shelves 17 for supporting food products and the like which are to be maintained at a low temperature. In the bottom part of storage space 15 are disposed a plurality of vegetable trays or fresheners 9, such trays being slidably supported at the underside of bottom shelf 17 which is solid and imperforate and serves as a cover for the vegetable fresheners when the latter are pushed into the storage space 15.

Within the storage space 15 are disposed a freezing element and a cooling element which together constitute an evaporator 18 of a refrigeration system. In addition to the cooling unit or evaporator 18, the refrigeration system includes a generator 19, a condenser 20 and an absorber 21 which are inter-connected in a manner well known in the art and which will now briefly be described. The system contains a solution of refrigerant in absorption liquid, such as ammonia in water, for example, and also an auxiliary agent or inert gas, such as hydrogen.

The generator 19 is heated in any suitable manner, as by a gas burner 22, for example, whereby refrigerant vapor is expelled from solution in generator 19. The refrigerant vapor flows upward through a standpipe 23 and a conduit 24 into the condenser 20 in which it is liquefied. Liquid refrigerant flows from condenser 20 through a U-shaped conduit 25 into the upper part of cooling unit or evaporator 18.

Liquid refrigerant in cooling unit 18 evaporates and diffuses into inert gas which enters the lower part thereof through a conduit 26. Liquid in cooling unit 18 evaporates and diffuses into the inert gas to produce a refrigerating effect with consequent absorption of heat from the surroundings. The rich gas mixture of refrigerant vapor and inert gas, that is, gas rich in refrigerant, flows from the upper part of cooling unit 18 through a conduit 27, an inner passage 28 of a gas heat exchanger 29, and a conduit 30 into the lower part of absorber 21.

In absorber 21 the rich gas mixture flows counter-current to downwardly flowing weak absorption liquid which enters through a conduit 31. The absorption liquid absorbs refrigerant vapor from the inert gas, and inert gas weak in refrigerant flows from absorber 21 through a conduit 32, outer passage 33 of gas heat exchanger 29, and conduit 26 into the lower part of cooling unit 18.

Absorption liquid enriched in refrigerant flows from the lower part of absorber 21 through a conduit 34, outer passage of a liquid heat exchanger 35, and a conduit 36 into the generator 19. Liquid is raised in the generator by a thermosiphon tube 37 and flows back to the generator through standpipe 23. Refrigerant vapor expelled out of solution in generator 19, together with refrigerant vapor entering through thermosiphon tube 37, flows upwardly through standpipe 23 and conduit 24 into the condenser 20, as explained above.

The absorption liquid from which refrigerant has been expelled flows from generator 19 through a conduit 36, inner passage of liquid heat exchanger 35, and conduit 31 to the upper part of absorber 21. This circulation of absorption liquid is due to the raising of liquid by thermosiphon tube 37.

Heat liberated with absorption of refrigerant vapor in absorber 21 is transferred to a suitable cooling medium which circulates through a coil 39 arranged in heat exchange relation with the absorber.

The outlet end of condenser 20 is connected by a conduit 40, vessel 41, and conduit 42 to the gas circuit, so that any inert gas which may pass through the condenser 20 can flow into the gas circuit. Refrigerant vapor not liquefied in condenser 20 flows through conduit 40 to displace inert gas in vessel 41 and force such gas through conduit 42 into the gas circuit. The effect of forcing gas into the gas circuit in this manner is to increase the total pressure in the system to insure condensation of refrigerant vapor in condenser 20.

The circulation of gas in the gas circuit including cooling unit 18 and absorber 21 is due to the difference in specific weight of the columns of inert gas rich and weak, respectively, in refrigerant vapor. Since the rich gas is heavier than the weak gas, a force is produced or developed within the system to cause flow of rich gas to the absorber 21 and flow of weak gas toward evaporator unit 18.

The cooling unit 18 includes an upper cooling element or coil 43 and a lower freezing element or coil 44 which are connected in series relation. Liquid refrigerant entering the upper coil 43 through conduit 25 flows through this coil and then through the lower coil 44 in counter-flow to inert gas which flows upward through the evaporator.

The upper cooling element or coil 43 is formed with a plurality of heat transfer fins 45 to provide a relatively extensive heat transfer surface for cooling air in storage space 15. The lower freezing element or coil 44 is arranged in thermal exchange relation with a shell 46 having a plurality of compartments, as shown most clearly in Fig. 3, to receive trays 47 for freezing ice cubes. The lower coil 44 normally operates below the freezing temperature of water whereby the shell 46 constitutes the freezing portion of evaporator 18. The upper coil 43 operates at a higher temperature than lower coil 44 and is employed primarily for cooling air in storage space 15.

In order to locate the evaporator coils 43 and 44 of cooling unit 18 in storage space 15, the rear insulated wall of the space is provided with an opening to receive a removable wall section 48 as shown most clearly in Figs. 2 and 4. The conduits connecting evaporator 18 and the other parts of the refrigeration system extend through the removable wall section 48. These connections include conduits 25, 26 and 27, and also a drain conduit 49 to permit flow of unevaporated liquid from evaporator 18 to the inner passage 28 of gas heat exchanger 29.

The cooling element 43 and freezing compartment 46 are located in the upper left-hand corner of storage space 15. Adjacent to and alongside the cooling element and freezing compartment 46 is arranged a housing or casing 50, as shown most clearly in Figs. 3 and 4. The casing 50 may be supported in position in space 15 in any suitable manner. As shown, angle brackets 51 may be secured to the bottom of the casing 50 at the rear thereof, and an angle bracket 52 may be secured to the top of the casing at the forward part thereof. The brackets 51 and 52 may be removably secured to the rear and top wall of inner shell 11, as indicated at 53 and 54, respectively.

The casing 50 forms a low temperature-high humidity compartment 55 which is arranged to be cooled by upper cooling element 43 with the aid of a heat transfer system. The left-hand side wall of the casing 50 is employed as a part of the heat transfer system. To this side wall is secured a metallic sheet 56 which is slightly less in height and substantially the same in length as the side wall, as shown most clearly in Figs. 3, 4 and 7. The metallic sheet 56 is provided with a plurality of spaced depressed portions 57 which may be welded to the side wall of casing 50 to maintain the wall and sheet in spaced relation and provide a fluid passage therebetween, and the peripheral edges of the sheet are hermetically secured, as by welding or brazing, to the side wall.

The upper part of sheet 56 is connected by a conduit or tube 58 to a crescent-shaped hollow member 59. The hollow member 59 is substantially the same in length as a straight conduit section of the upper cooling element 43, as shown in Fig. 4. The hollow member is removably secured in close contact with the upper cooling element 43 by straps 60 and suitable fasteners 61. The hollow member 59 is preferably formed of material which is somewhat resilient so that it will conform to the shape of the conduit section when it is pressed against the latter by the straps 60 and fastener 61.

The hollow member 59, conduit 58, and metallic sheet 56 and side wall of casing 50 to which it is secured form a vaporization-condensation element which is partly filled with a suitable volatile liquid. The volatile liquid, such as ethyl chloride, evaporates in the evaporation portion formed by the sheet 56 and side wall to which it is secured and takes up heat, thereby effecting cooling of compartment 55. The vapor flows upward through conduit 58 into hollow member 59 which forms a condensation portion of the element and in which the vapor is cooled and condensed by the upper coil or cooling element 43. The space between the metallic sheet 56 and wall to which it is secured and the size of conduit 58 should be so dimensioned that liquid flows freely by gravity from the condensation portion 59 back to the evaporation portion.

The shell 46 and casing 50 are provided with a front baffle plate 62 which is supported by the shell and casing in any suittable manner. The front baffle plate 62 extends from one side wall to the opposite side wall of storage space 15, as shown in Figs. 1 and 4, and is provided with a plurality of openings in alignment with the openings at the front of shell 46 and casing 50. Doors 63, 64 and 65 are hinged to the front baffle plate 62 for closing the openings, the door 63 closing the front opening of shell 46 and the door 64 closing the front opening of the high humidity compartment 55 formed by casing 50.

The door 65 permits access into a third compartment 66 alongside the freezing and high humidity compartments 46 and 55, respectively.

The compartment 66 is not completely closed from the storage space 15 proper and this compartment is cooled by air circulating in storage space 15. As shown most clearly in Figs. 3 and 4, a shelf 67 of an open or perforated type may be supported by hooks 68 secured to the front baffle plate 62 and walls of inner shell 11, whereby food products and the like may be stored in compartment 66.

The door 64 for middle compartment 55 is provided with a gasket 55a which may be formed of rubber or the like, as shown in Fig. 4a. The gasket 55a is held in place by metal strips 64a which are riveted or otherwise secured to the flanges of door 64. The door 63 for shell 46 is also provided with a gasket similar to the gasket 55a for compartment 55. A drain conduit 69 is connected to the lower part of casing 50 to permit condensate to drain from the high humidity compartment 55 to a drip or defrosting tray 70 located beneath shell 46.

As shown most clearly in Figs. 1 and 5, the front baffle plate 62 extends below the tray 70 so that the tray is hidden from view when it is in its upper or normal position beneath the shell 46. Suitable mechanism is provided to lower and raise tray 70 between the positions shown in Figs. 5 and 8. When access to tray 70 is desired, it is readily lowered and moved forward underneath the lower edge of front baffle plate 62 from the position shown in Fig. 5 to that shown in Fig. 8. Referring more particularly to Figs. 3, 5 and 8, the mechanism provided includes a three-sided frame having spaced U-shaped side channels 71 and 72 and a U-shaped rear channel 73 connecting the side channels 71 and 72. The frame is open at its forward end and the U-shaped channels 71, 72 and 73 form a groove to receive the flanged edges of the side walls of tray 70. As shown most clearly in Figs. 2 and 3, the forward and rear parts of side channel 72 at the right-hand side of shell 46 are pivotally connected by links 74 to studs 75 fixed to a side wall of casing 50. The forward part of the side channel 71 at the left-hand side of shell 46 is pivotally connected by a link 76 to a stud 77 secured to a side wall of inner shell 11, as shown in Figs. 3, 5 and 8. To the rear part of side channel 71 is pivotally connected the long arm of a bell crank 78 which is pivotally connected to a stud 79 secured to the side wall of inner shell 11 at the same level as stud 77. The short arm of bell crank 78 is connected by a link 80 to an intermediate part of an operating lever 81.

The rear end of lever 81 is pivotally connected to a stud 82 secured to the side wall of inner shell 11, as shown most clearly in Fig. 3. One end of a coil spring 83 is connected to stud 82 and the opposite end thereof is connected to the outer end of the long arm of bell crank 78. The operating lever 81 extends through a vertically extending slot 84 in the front baffle 62, as shown most clearly in Fig. 6, and the extreme forward end is provided with a horizontal handle portion 85. The slot 84 is notched at its upper and lower ends at 86 and 87, respectively, to keep the tray 70 either in its upper or lower position, as will be described presently.

With the handle 85 in the upper notch 86, as shown in Fig. 6, the parts of the mechanism for raising and lowering tray 70 are in the position shown in Fig. 5, with the tray 70 in its upper inaccessible position and hidden or concealed from view at the rear of front baffle plate 62. When access to tray 70 is desired handle 85 is moved to the right, so that the upper notch 86 is ineffective to hold operating lever 81 in the upper position shown in Fig. 5. The handle 85 is then lowered in slot 84, and, when the lever is in the position shown in Fig. 8, the handle can be moved to the left so that the lower notch 87 will be effective to keep lever 81 in its lower position. When lever 81 is moved from the position shown in Fig. 5 toward the position shown in Fig. 8, link 80 causes clock-wise rotation of bell crank 78 until the long arm thereof is moved to a straight vertical position. The link 76 at the left-hand side of shell 46 and the links 74 at the opposite side thereof also move to straight vertical positions, whereby the frame formed by the side channels 71 and 72 and rear channel 73 moves downward and forward with the forward part of the frame passing beneath and in front of the baffle 62, as shown in Fig. 8. With the tray supporting frame in its lower position, the tray 70 may be moved forward along the side channels 72 to permit access thereto.

When the tray 70 is moved downward and forward from the position shown in Fig. 5 to the position shown in Fig. 8, the coil spring 83 is stretched and placed under tension. Since the operating lever 81 is held in the lower notch 87 in slot 84, the tray 70 will remain in its lower position against the tension of coil spring 83. After the tray 70 is pushed rearwardly along the side channels 71 and 72 until the rear part thereof is against the rear channel 73, the handle 85 may be moved to the right to release operating lever 81 from the lower notch 87 to effect raising of tray 70 to its upper concealed position. In order to reduce the amount of manual effort required to raise the tray 70, the coil spring 83 is made sufficiently strong so that it will tend to pull bell crank 78 in a counter clock-wise direction, and this upward pull exerted by the spring, supplemented by a relatively small lifting force on handle 85, will be effective to raise operating lever 81 to its upper position where the handle 85 may be moved to the left, so that the upper notch 86 will receive the forward part of the operating lever and hold the latter in its upper position.

In Figs. 9 and 10 I have illustrated another embodiment of the invention in which a heat conductive path is provided between the shell 46 of low temperature cooling element 44 and a shell or housing 50a forming the high humidity compartment 55. The shell 50a may be supported in the upper part of storage space 15 by brackets 51 and 52 in the same manner as shell 50 in Figs. 4 and 5 and described above. The left-hand side wall of shell 50a is formed with a plurality of buttons or caps 99 having substantially flat bottom surfaces. In supporting the shell 50a in storage space 15 by the brackets 51 and 52, the bottom surfaces of the caps 88 are pressed against the shell 46 and in good thermal contact with the latter. The shell 50a, buttons 88 and shell 46 provide a heat conductive path whereby heat is taken up by shell 50a to effect cooling of compartment 55 and such heat is rejected or given up to low temperature cooling element 44.

During operation, air cooled by thermal transfer with the heat transfer fins 45 and coil forming upper cooling element 43 flows downward past shell 46 of freezing element 44 where additional cooling of air is effected. It is to be understood, however, that the heat transfer fins and coil of upper cooling element 43 are provided primarily for cooling air, and that the shell 46 of lower freezing element 44 is provided with limited heat transfer surface to assist in effecting air cooling in storage space 15. The cooled air flows downward in storage space 15 from cooling elements 43 and 44 to replace warmer air which flows upward and passes through compartment 66 and thence across the top of compartment 55. This natural circulation of air in the storage space 15, which is indicated by the arrows in Fig. 3, is due to the differences in specific weights of air at different temperatures. Hence, the high humidity compartment 55 serves as a member for dividing the downflow current and upflow current of air in storage space 15. By spacing the high humiditiy compartment 55 from the top of storage space 15 the upflow current is caused to flow over the top of the compartment 55 and over the surfaces of heat transfer fins 45 and upper coil forming the upper cooling element 43.

Since the shell 46 and coil associated therewith constitute a freezing element 44 which operates below the freezing temperature of water, water vapor is condensed out of the air flowing over the surfaces of shell 46 and congeals on the latter. Due to such removal of water vapor from the air, the humidity in storage space 15 is reduced. The regions of the storage space directly influenced and cooled by the air circulating over the cooling elements 43 and 44 may be referred to as the storage space proper and includes the compartment 66 and the intermediate region below the compartment 55 and above the bottom shelf 17. This intermediate region extends completely across the food storage space and is not obstructed by other parts, so that efficient utilization of this space can be effected. The compartment 66 and intermediate region constitute a cooling zone for storing food products and the like which is maintained cool and dry, due to extraction of moisture by the freezing element 44 and attendant formation of frost on shell 46. Since the upwardly flowing air is the warmest air in this cooling zone, the compartment 66 provides an auxiliary low humidity region which is at a slightly higher temperature than the intermediate region of storage space 15.

The vegetable trays or fresheners 9 are closed by the bottom shelf 17, so that these trays provide a cooling zone having a higher humidity than in the zone formed by storage space 15. By closing the trays or fresheners 9 so that substantially no flow of air can take place between the spaces within trays 9 and storage space 15, the relatively dry air circulating in the storage space cannot extract moisture from vegetables and the like which are placed in the trays 9.

The door 64 closes off the compartment 55 so that substantially no flow of air takes place between this compartment and storage space 15. The compartment 55 provides a cooling zone which is maintained at a higher humidity and at a lower temperature than storage space 15. The low temperature-high humidity cooling zone formed by compartment 55 is always maintained at a temperature above 32° F. to prevent congealing of moisture and formation of frost therein. In the embodiment in Figs. 3 and 4, this is accomplished by operating the entire upper cooling element 43, or at least the portion thereof in thermal contact with condensation portion 59, at a temperature above 32° F., or at least at a temperature no farther below 32° F. than will result in non-freezing temperature in compartment 55, taking into account the temperature drop through the transfer member or medium. By so designing the freezing system that condensation portion 59 of the vaporization-condensation circuit is approximately at or above 32° F. under all operating conditions of the refrigeration apparatus, the metal plate 56 and cooperating metal wall of casing 50, which together form the vaporization portion of the heat transfer element, will always be above 32° F. so that non-freezing refrigeration of compartment 55 is effected.

Similarly, in the embodiment in Figs. 9 and 10, the cooling effect is transmitted from shell 46 to housing 50a through the buttons or caps 88, the number and area of which can be designed so that housing 50a will be maintained at a lower temperature than storage space 15 proper but at a tempertaure above 32° F. With the temperature of compartment 55 above the freezing temperature of water, no congealing or frost formation can take place therein, whereby the humidity in this compartment will be relatively high and considerably greater than in storage space 15.

Since the mechanism for raising and lowering tray 70 is secured by studs 77, 79 and 82 to the side wall of inner shell 11 and by studs 75 to shell 50 and not connected to the cooling unit or evaporator 18, the latter may be removed from storage space 15 by loosening the fasteners 61 and removing the crescent-shaped condensation member 59 from upper cooling element 43. When this is done, the cooling unit 18 including removable wall part 48 can be moved rearwardly with other parts of the refrigeration apparatus. Likewise, if it is desired to remove shell 50 and the heat transfer circuit associated therewith, this may be done by loosening the fasteners 61 to disconnect the condensation member 59 from the upper cooling element 43 and disconnecting shell 50 from the brackets 51 and 52 at 53 and 54, respectively. In such case, the casing 50 may be provided with threaded openings to receive the studs 75, so that these parts will also be removable from the shell 50 to permit removal of the latter from storage space 15 together with the heat transfer circuit. It will be seen, therefore, that the cooling unit or evaporator 18 of the refrigeration apparatus may be removed from storage space 15 independently of shell 50 and the heat transfer circuit associated therewith, and that the shell 50 and its associated heat transfer circuit may also be removed from storage space 15 independently of the cooling unit or evaporator 18 of the refrigeration apparatus.

While I have shown and described several embodiments of my invention, it will be apparent to those skilled in the art that modifications and changes may be made without departing from the spirit and scope of the invention. Thus, the natural circulation of air may be augmented by forced draft. I therefore do not wish to be limited to the actual structure shown in the drawings and described in the specification, and aim in the following claims to cover all modifications and changes which fall within the true spirit and scope of the invention.

What I claim is:

1. In a refrigerator having a general insulated storage space, a primary evaporator in the upper part of said storage space, a self-contained high humidity chamber of relatively low temperature in said space alongside said primary evaporator, said chamber having a metal wall, a second evaporator partly formed by said wall, a condenser in heat exchange relation with the first-mentioned evaporator, and a connection between said second evaporator and said condenser.

2. In a refrigerator having a general insulated food space having a plurality of openwork shelves to permit air circulation and store food, a primary evaporator disposed therein for cooling air therein, said evaporator being disposed in said space to cause air to flow by natural convection in a defined stream including downflow and upflow currents, the evaporator being in the downflow current, and a member dividing the downflow current from the upflow current comprising a substantially closed high humidity chamber.

3. In a refrigerator having a general insulated food space, a primary evaporator disposed therein for cooling air therein, said evaporator being disposed in said space to cause air to flow in a defined stream including downflow and upflow currents, the evaporator being in the downflow current, a member dividing the downflow current from the upflow current comprising a substantially closed high humidity chamber of relatively low temperature situated to permit air to flow over the top thereof as well as to the sides thereof, and a fixed conductor to transfer a major portion of the heat from said chamber to said evaporator to maintain said temperature.

4. A refrigerator including a cabinet having a thermally insulated storage space, a shell in said space forming a first compartment in the upper part of said space, refrigeration apparatus including an evaporator having an ice freezing compartment in the upper part of said space and alongside said shell, said evaporator and shell being narrower than said storage space to provide a third compartment at the opposite side of said shell, a front wall member for all of said compartments extending from one side to the opposite side of said storage space, said wall member having openings to permit access to each of said compartments, closure members for the openings, a heat conductor for transmitting cooling effect from said evaporator to said first compartment, said heat conductor being so constructed and arranged that air in said first compartment is maintained at a higher humidity than air in said storage space, and said evaporator being effective to cause natural circulation of air in said storage space whereby air flows downward past said evaporator at one side of said first compartment and upward through said third compartment at the opposite side of said first compartment and thence across the top of the latter.

5. A refrigerator including a thermally insulated cabinet, said cabinet having a general food storage compartment, an ice freezing compartment, and a closed high humidity compartment, said ice freezing compartment and said high humidity compartment being located laterally of each other and substantially at the same level in said general storage compartment, a refrigeration system of the type in which cooling is produced by evaporation of refrigerant in the presence of an auxiliary fluid, said system including a low temperature cooling element comprising a pipe coil arranged to cool said ice freezing compartment, a high temperature cooling element located above said low temperature cooling element and arranged for cooling air in said general storage compartment, and a heat conductor for transferring heat from said high humidity compartment to said high temperature cooling element.

WILLIAM T. HEDLUND.